US012126969B1

(12) United States Patent
Andryzcik et al.

(10) Patent No.: US 12,126,969 B1
(45) Date of Patent: Oct. 22, 2024

(54) AUDIO TONE DETECTION USING ANALOG PROCESSING

(71) Applicant: ASPINITY, INC., Pittsburgh, PA (US)

(72) Inventors: Steven Andryzcik, Pittsburgh, PA (US); Brandon David Rumberg, Pittsburgh, PA (US); Matthew Zeleznik, Pittsburgh, PA (US); Michael Fuhrman, Pittsburgh, PA (US)

(73) Assignee: ASPINITY, INC., Pittsburgh, PA (US)

( * ) Notice: Subject to any disclaimer, the term of this patent is extended or adjusted under 35 U.S.C. 154(b) by 0 days.

(21) Appl. No.: 18/608,072

(22) Filed: Mar. 18, 2024

(51) Int. Cl.
*H04R 29/00* (2006.01)

(52) U.S. Cl.
CPC .................................... *H04R 29/00* (2013.01)

(58) Field of Classification Search
CPC ........ H04R 29/00–008; H04R 3/04–10; H03G 5/00; H03G 5/005; H03G 5/14; G08B 3/10; H04B 1/0276
USPC ............ 381/56, 101, 98; 333/28 T; 379/418; 455/267; 340/384.1, 384.4, 384.5, 384.73
See application file for complete search history.

(56) References Cited

U.S. PATENT DOCUMENTS

| | | | | |
|---|---|---|---|---|
| 5,576,685 | A * | 11/1996 | Saito | G08B 3/10 340/384.1 |
| 7,605,687 | B2 * | 10/2009 | Morris | G08B 3/10 340/384.73 |
| 9,557,960 | B2 * | 1/2017 | Kraft | G06F 3/165 |
| 9,787,821 | B2 * | 10/2017 | Bender | H04M 1/72451 |
| 2012/0243694 | A1 * | 9/2012 | Bradley | G10L 25/51 381/56 |
| 2015/0234443 | A1 * | 8/2015 | Kulathumani | G06F 1/3206 340/3.1 |
| 2022/0241502 | A1 * | 8/2022 | Campbell | G16H 20/17 |

* cited by examiner

*Primary Examiner* — Xu Mei
(74) *Attorney, Agent, or Firm* — Buckley, Maschoff & Talwalkar LLC

(57) ABSTRACT

According to some embodiments, re-programmable and/or reconfigurable analog circuitry monitor an acoustic signal sensed by a sound sensor and selectively generates a tone detection signal in response to an analysis of the acoustic signal and a defined tone detection condition. The tone detection condition may be, for example, associated with presence of at least one pre-determined tone frequency. A digital Microcontroller Unit ("MCU"), coupled to the analog circuitry, may receive the tone detection signal as an interrupt causing the MCU to wake-up, generate a digital timestamp, and/or analyze a series of digital timestamps to detect at least one temporal audio alarm pattern, such as a temporal-three ("T3") or a temporal-four ("T4") audio alarm pattern.

18 Claims, 21 Drawing Sheets

1400

| ALARM TONE IDENTIFIER 1402 | DATE (TIME) 1404 | ALARM TONE EVENT IDENTIFIER 1406 | TRIGGERED ACTION 1408 |
|---|---|---|---|
| AT_101 | 14 OCT 2026 (06:23:56) | T3 | TRANSMIT SIGNAL |
| AT_102 | 20 OCT 2026 (14:10:43) | T4 | TRANSMIT SIGNAL |
| AT_103 | 13 OCT 2026 (12:39:04) | T3 AND T4 | TRANSMIT TWO SIGNALS |
| AT_104 | 13 OCT 2026 (12:39:52) | T3 | TRANSMIT SIGNAL |

FIG. 14

AUDIO TONE DETECTION USING ANALOG PROCESSING

BACKGROUND

An alarm, such as a smoke or Carbon Monoxide ("CO") detector, may monitor a condition and generate an alarm with particular audio tones and/or patterns when the condition is detected. In some cases, an alarm may support an Internet of Things ("IoT") implementation or similar types of communications able to transmit data to other devices (e.g., a central controller or smart home hub) when the condition has been detected. Such a transmission might, for example, trigger a recording of the occurrence of an event (e.g., "smoke was detected on Jul. 7, 2026 at 12:52 AM"), automatically transmit another message (e.g., to an owner's smartphone or an emergency response agency), or otherwise initiate an action (e.g., turning on a sprinkler system or turning off an oil heater).

An existing property, however, may have already installed alarms that lack an ability to transmit data to other devices (e.g., an office building may have hundreds or thousands of alarms that were previously installed) and replacing the alarms might be costly and a time-consuming undertaking. In some cases, an additional alarm monitoring device might be installed to listen for the relevant audio tones and/or patterns and transmit information to other devices when the audio alarm is detected. However, such an additional alarm monitoring device typically must be installed in close proximity to the alarm so that it can accurately identify the appropriate tones and/or patterns (e.g., the alarm monitoring device might need to be to be placed within six inches of the alarm). This might be inconvenient, such as when the alarm is installed on a ceiling. In addition, similar tones may exist in the environment (e.g., from a microwave or washing machine) making detection of an audio alarm difficult.

Moreover, it might be difficult to attach the alarm monitoring device to an external power source. As a result, a battery powered alarm monitoring device may be preferred. However, typical alarm monitoring devices use digital processors and circuitry to continuously monitor audio information, which can utilize a substantial amount of power (and reduce battery life).

It would be desirable to provide audio tone detection in an accurate, automatic, and power efficient manner.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIG. 14 is a portion of a tabular alarm tone event database in accordance with some embodiments.

Figure 1:
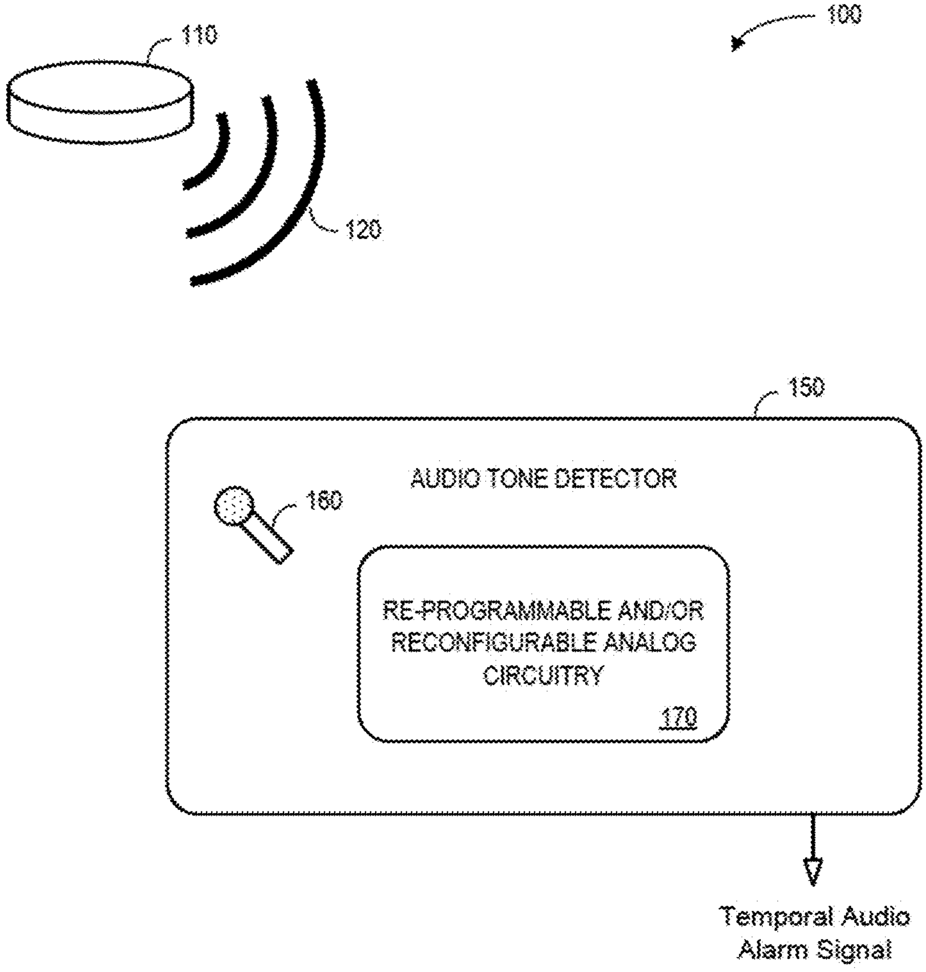
FIG. 1 is a high-level system architecture in accordance with some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Some embodiments described herein provide a new way to detect audio tones. For example, FIG. 1 is a high-level system 100 architecture in accordance with some embodiments. The system 100 includes an alarm 110 that generates a particular audio tone and/or pattern 120 when a condition is detected (e.g., a smoke alarm or CO alarm). The system 100 further includes an audio tone detector 150 with a sound sensor 160, such as a microphone, which provides an acoustic signal to re-programmable and/or reconfigurable analog circuitry 170. According to some embodiments, a remote operator or administrator device may be used to configure or otherwise adjust elements of the system 100.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The re-programmable and/or reconfigurable analog circuitry 170 may store information into and/or retrieve information from various data stores (e.g., an alarm tone event database), which may be locally stored or reside remotely from the re-programmable and/or reconfigurable analog circuitry 170. Although a single sound sensor 160 and re-programmable and/or reconfigurable analog circuitry 170 are shown in FIG. 1, any number of such devices may be included. Moreover, various devices described herein might be combined according to embodiments of the present invention. For example, in some embodiments, the sound sensor 160 and the re-programmable and/or reconfigurable analog circuitry 170 might comprise a single apparatus. Some of the system 100 functions may be performed by a constellation of networked apparatuses, such as in a distributed processing or cloud-based architecture.

A user may access the system 100 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via a remote device (e.g., to specify alarm tone parameters or thresholds) and/or provide or receive automatically generated recommendations, alerts, or results associated with the system 100.

Figure 2:
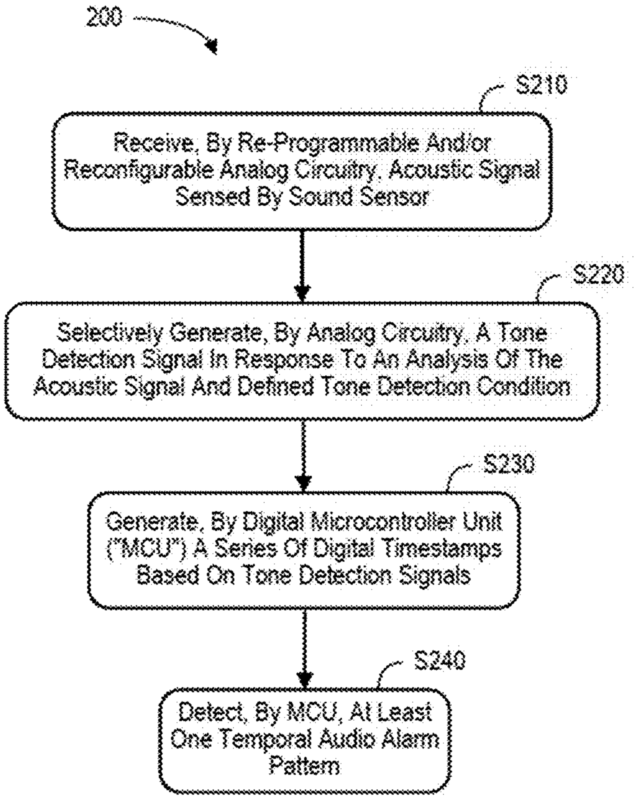
FIG. 2 is a method according to some embodiments.

FIG. 2 is a method 200 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, receiving, by re-programmable and/or reconfigurable analog circuitry, an acoustic signal sensed by a sound sensor (e.g., a Micro-Electro-Mechanical System ("MEMS") microphone). At S220, the analog circuitry may selectively generate a tone detection signal (e.g., a digital tone detection signal) in response to an analysis of the acoustic signal and a defined tone detection condition. The tone detection condition may be associated with, for example, presence of at least one pre-determined tone frequency.

At S230, a digital processor, such as a digital Microcontroller Unit ("MCU"), is kept in a low-power state awaiting an interrupt (e.g., a rising and/or falling edge) from the tone detection signal. When interrupted by a rising and/or falling edge from the tone detection signal, the MCU generates a digital timestamp (e.g., a timestamp will be logged at each rising and falling edge of the tone detection signal) and stores each digital timestamp in the MCU's internal memory. At S240, the MCU may analyze the series of digital timestamps, detect at least one temporal audio alarm pattern, and output a temporal audio alarm detection signal. According to some embodiments, the analysis of the acoustic signal includes reverberation reduction (e.g., performed using a threshold adapted on an output of bandpass filters). In some embodiments, the analysis of the acoustic signal includes background energy adaptation using at least one out-of-band filter. The background energy adaptation may be, for example, associated with an algorithm match via an interrupt-based asynchronous matched filter that is trained during installation.

In some embodiments, the tone detection signal generalizes a tone presence estimate and confidence score. Moreover, the re-programmable and/or reconfigurable analog circuitry may analyze the acoustic signal for a plurality of different tone detection conditions (e.g., to detect various alarm tone frequency ranges or other audio conditions, such as the sound of breaking glass). In some cases, the analysis generalizes in-band and out-of-band information associated with spectral normalization.

Figure 3:
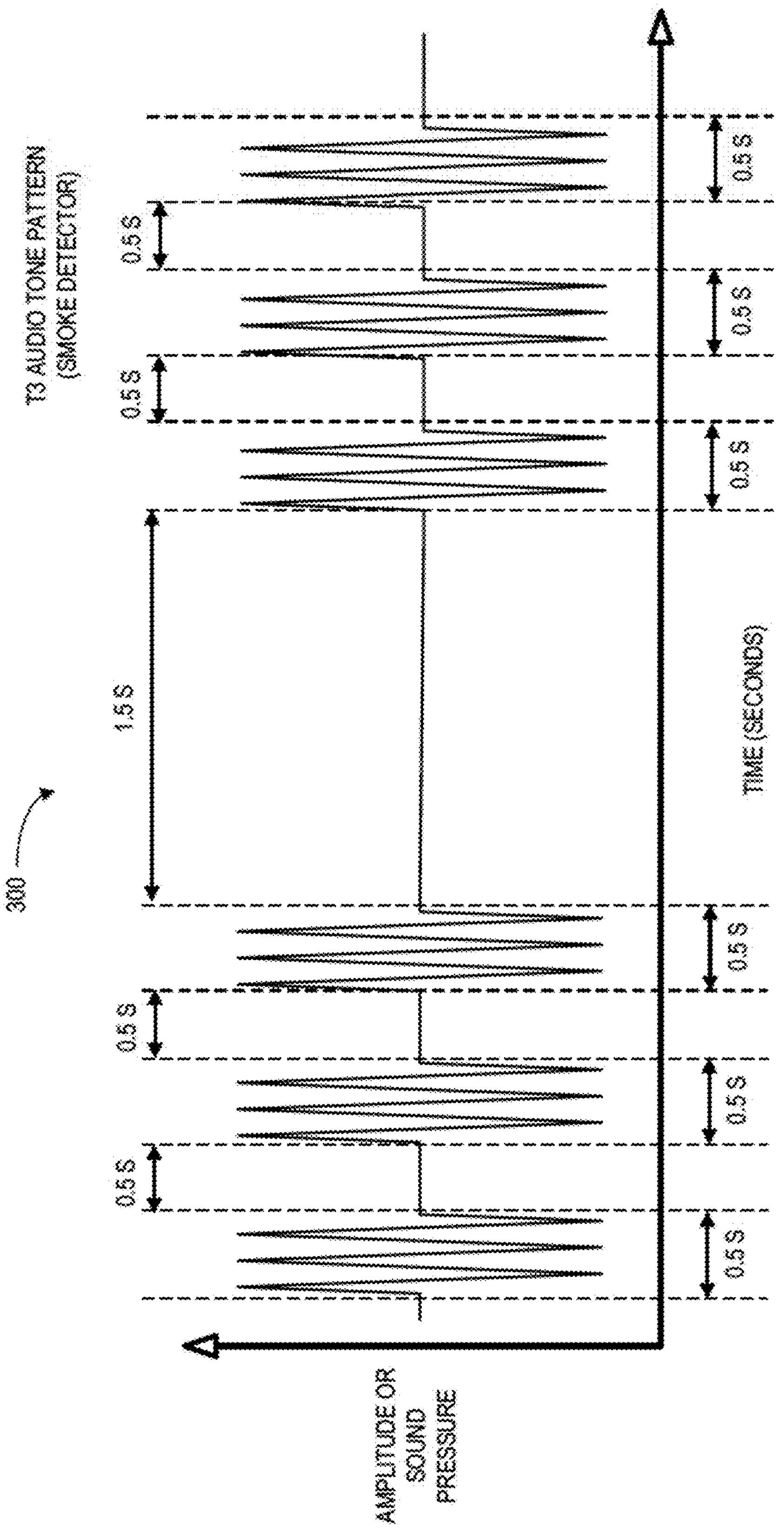
FIG. 3 illustrates a T3 alarm tone pattern.

The temporal audio alarm detection signal might be associated with a smoke alarm or CO alarm. FIG. 3 illustrates a Temporal-Three ("T3") alarm tone pattern 300 that might be emitted by a smoke alarm. The pattern 300 may be associated with, for example, the American National Standards Institute ("ANSI") and Acoustical Society of America ("ASA") S3.41-2015 specification entitled "Audible Emergency Evacuation Signals," National Fire Protection Association ("NFPA") regulations, and/or the International Standards Organization ("ISO") standard 8201 entitled "Alarm Systems: Audio Emergency Evacuation Signal." The T3 alarm tone pattern 300 is commonly used for smoke detectors but may also be associated with gas leaks, explosions, nuclear radiation, etc.). The pattern 300 includes a series of three 0.5 second tones separated by 0.5 second delays. The tone may comprise, for example, 3.1 kHz sine wave tones or 520 Hz square wave tones. Each series of three tones is separated by 1.5 seconds (for an overall pattern 300 cycle of 4.0 seconds).

Figure 4:
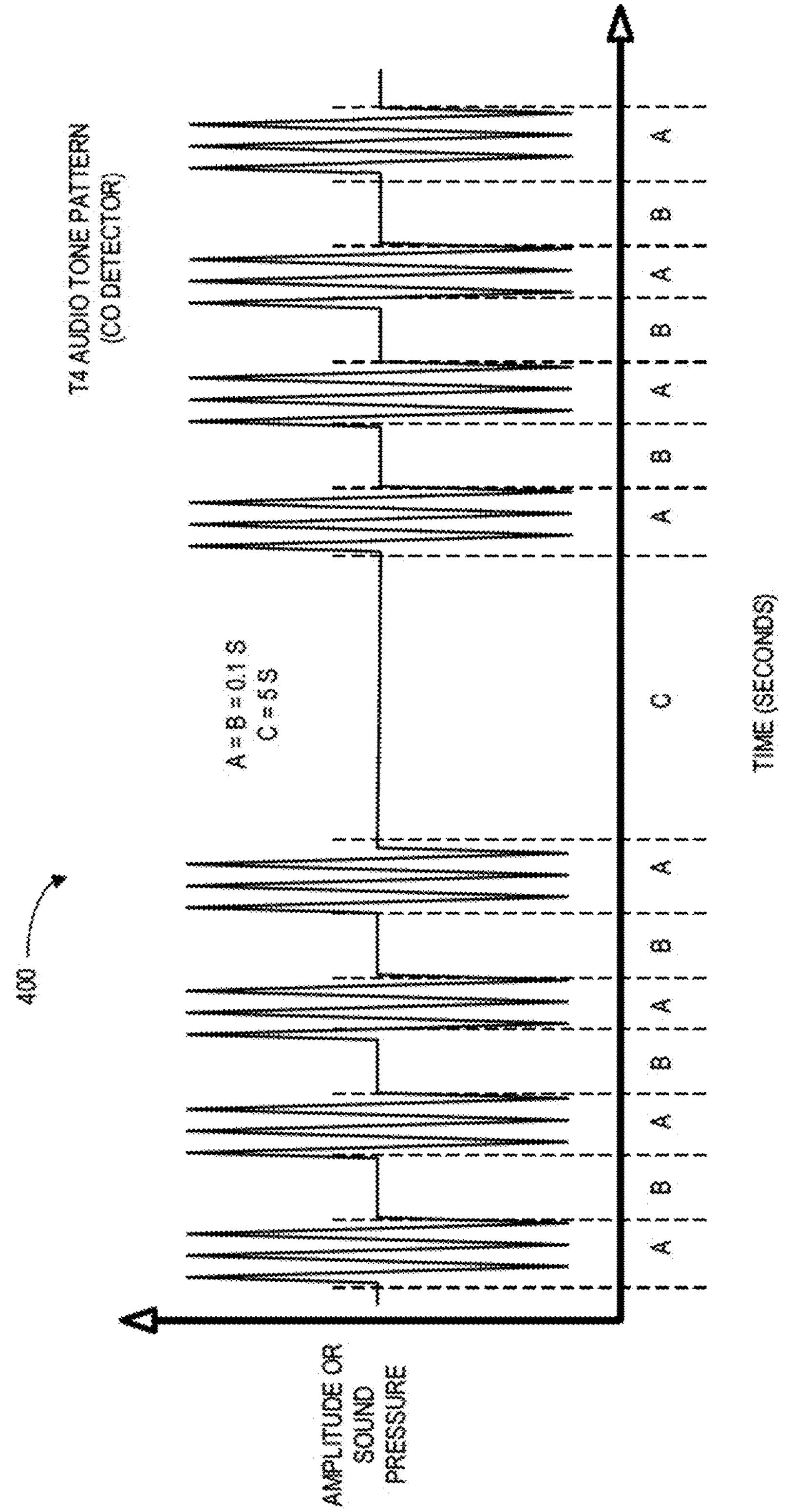
FIG. 4 illustrates a T4 alarm tone pattern.

Similarly, FIG. 4 illustrates a Temporal-Four ("T4") alarm tone pattern 400 commonly associated with CO detectors. The pattern 400 includes a series of four 100 millisecond tones A (plus or minus 10 milliseconds) separated by 100 millisecond delays B (plus or minus 10 milliseconds). Each series of four tones is separated by 5 seconds plus or minus 0.5 seconds (for an overall pattern 400 cycle of approximately 5.7 seconds).

Figure 5:
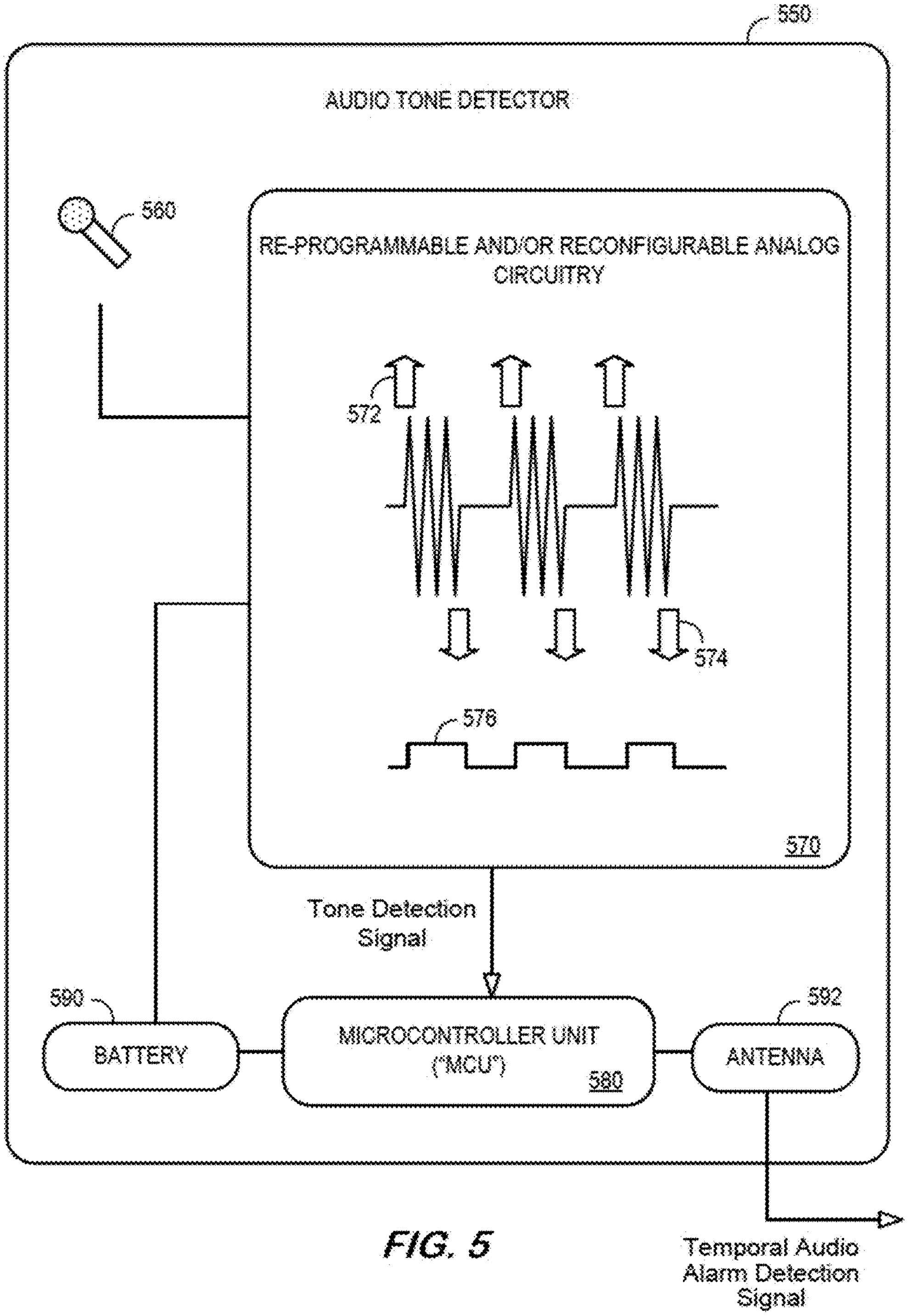
FIG. 5 is a more detailed audio tone detector architecture in accordance with some embodiments.

FIG. 5 is a more detailed audio tone detector 550 architecture in accordance with some embodiments. The audio tone detector 550 includes a sound sensor 560, such as a microphone, that provides an acoustic signal to re-programmable and/or reconfigurable analog circuitry 570. Although some embodiments described herein utilize re-programmable and/or reconfigurable analog circuitry 570, embodiments may be associated with other types of circuitry including fixed-function circuitry. The analog circuitry 570 analyzes the acoustic signal based on a defined tone detection condition to determine presence of at least one pre-determined tone frequency. The analog circuitry 570 may then output a tone detection signal 576 based on a change from "not present" to "present" 572 (a "rising edge") and/or a change from "present" to "not present" 574 (a "falling edge"). The tone detection signal 576 may comprise, for example, a wakeup signal that is provided to a Microcontroller Unit ("MCU") 580 (e.g., via an interrupt pin).

According to some embodiments the analog circuitry 570 and MCU 580 are powered by a battery 590. The MCU 580 may create a digital timestamp each time such a wakeup signal is received from the analog circuitry 570 (e.g., at each rising and falling edge of the tone detection signal 576). A series of digital timestamps can then be analyzed by the MCU 580 looking for T3 and/or T4 alarm patterns. When a T3 and/or T4 alarm pattern is detected, the audio tone detector 550 may transmit a temporal audio alarm detection signal via an antenna 592.

Figure 6A:
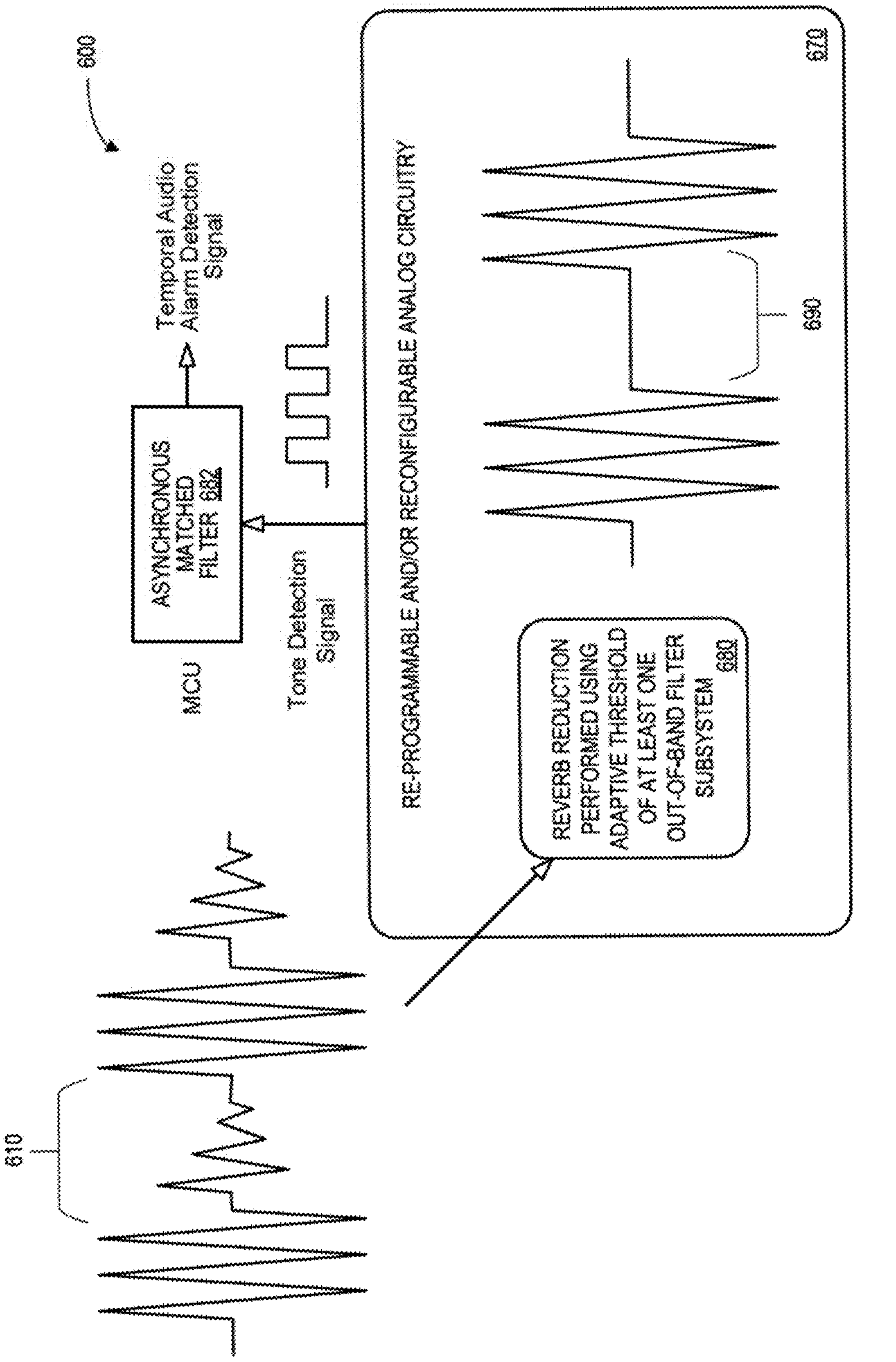
FIG. 6A is a system with reverberation reduction according to some embodiments.
Figure 6B:
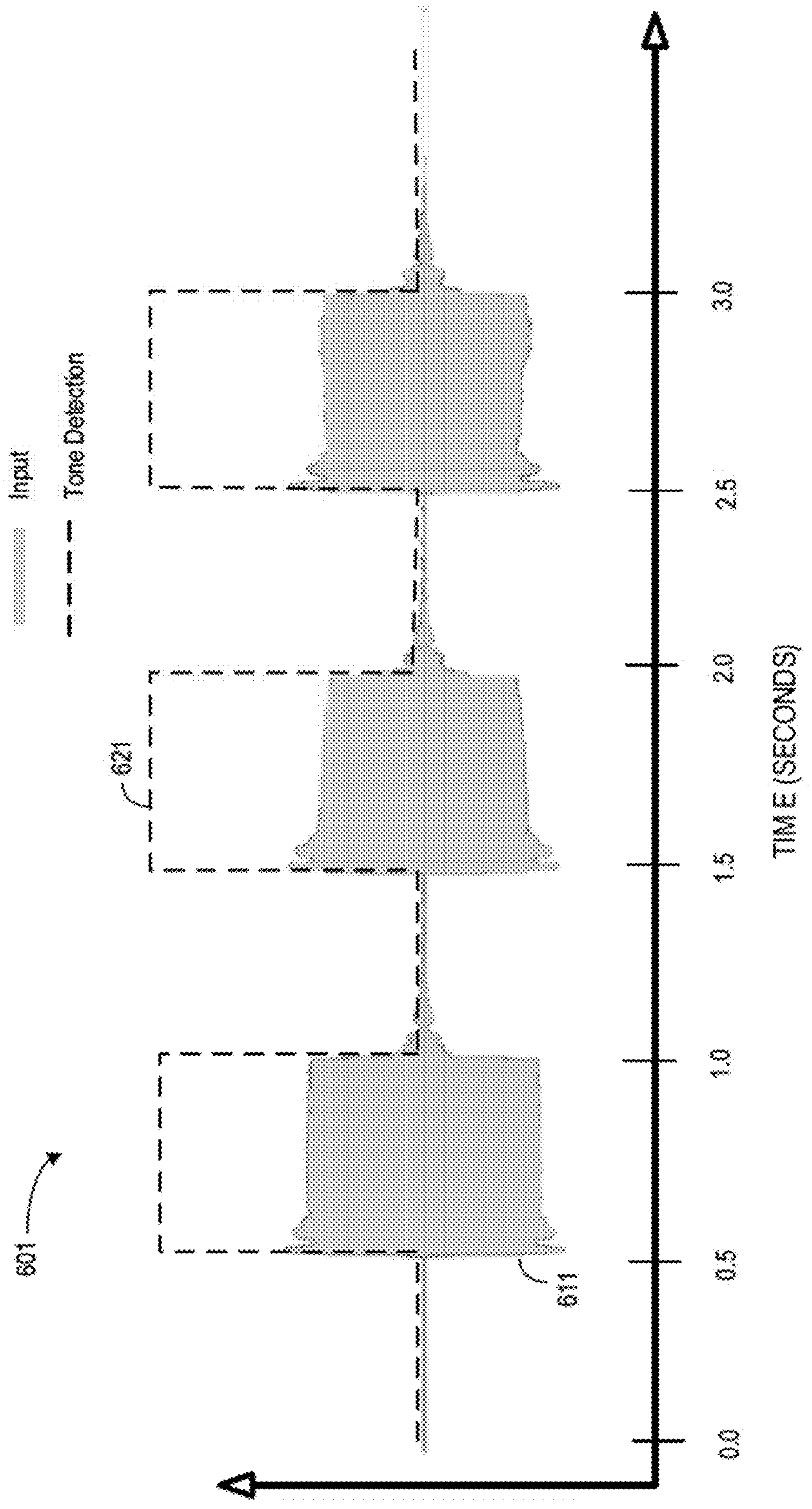
FIGS. 6B and 6C illustrate signals in accordance with some embodiments.
Figure 6C:
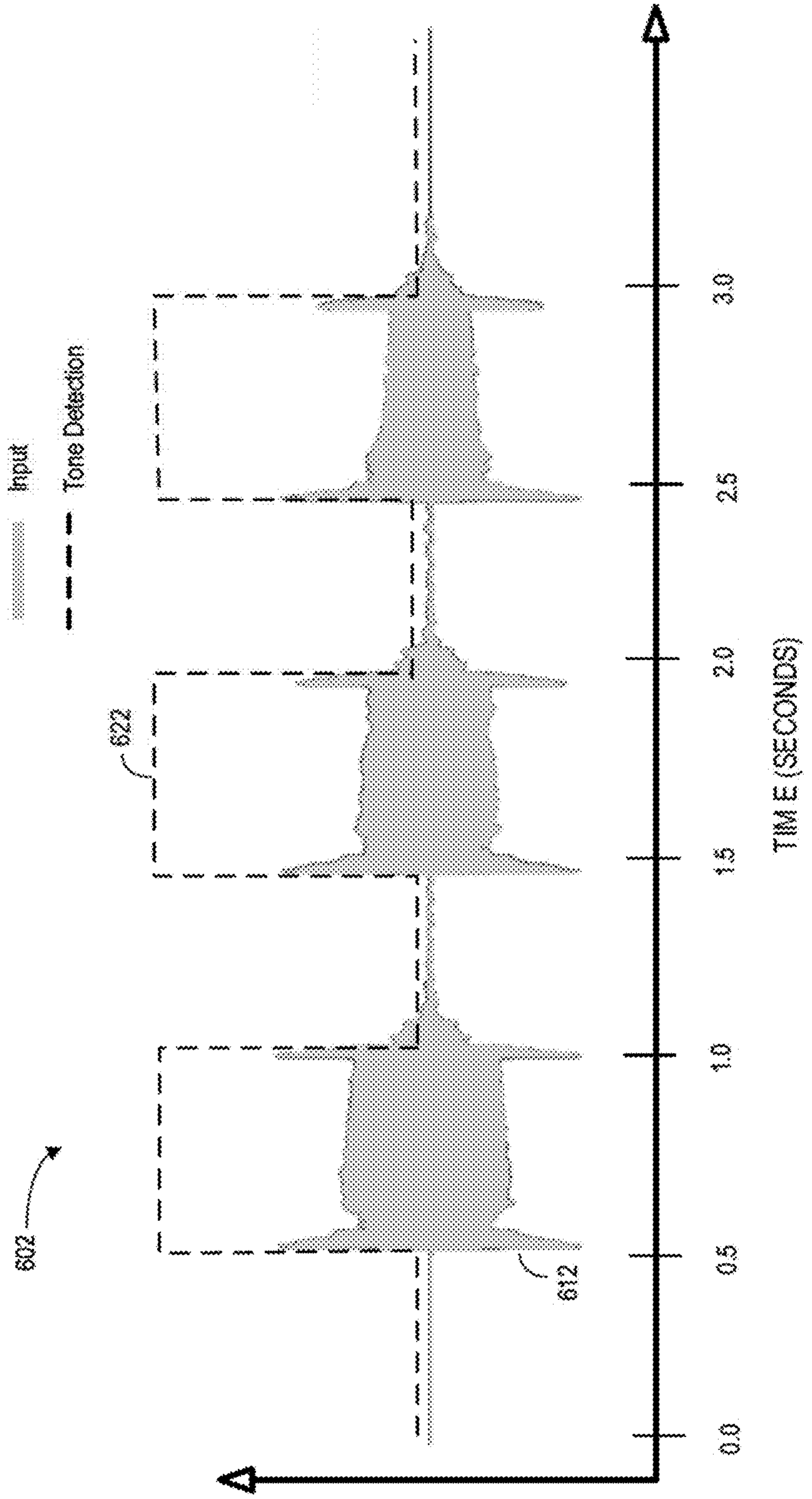

An accurate detection of a temporal audio alarm can be difficult when the audio tone detector 550 is a substantial distance from an alarm. For example, FIG. 6A is a system 600 with reverb reduction according to some embodiments. Note that a received acoustic signal may include sound reverberations 610 in between the audio tones (e.g., sound spikes at the onset and/or offset of a tone) making the signal difficult to analyze. To address this issue, re-programmable and/or reconfigurable analog circuitry 670 may utilize a threshold adapted from an out-of-band filter subsystem 680. As a result, the sound reverberations 690 in between the audio tones may be reduced or eliminated making the signal easier to analyze when generating the tone detection signal that provided to an asynchronous matched filter 682 (e.g., interrupt-based and incorporated in an MCU) that creates the final temporal audio alarm detection signal. FIGS. 6B and 6C illustrate signals according to some embodiments. In particular, FIG. 6B is an example 601 of an input signal 611 and a tone detection signal 621 that incorporates reverberation reduction. Note that the falling edge of the tone detection signal 621 may avoid including most of the reverberation noise. By utilizing circuitry that intentionally excludes this section of each pulse, embodiments may improve accuracy of confidence scores. Similarly, FIG. 6C is an example 602 of an input signal 612 and a tone detection signal 622 that handles non-ideal peaks in the input signal 612 that are representative of the different possible acoustic properties of the area in which the alarm is operating.

Figure 7A:
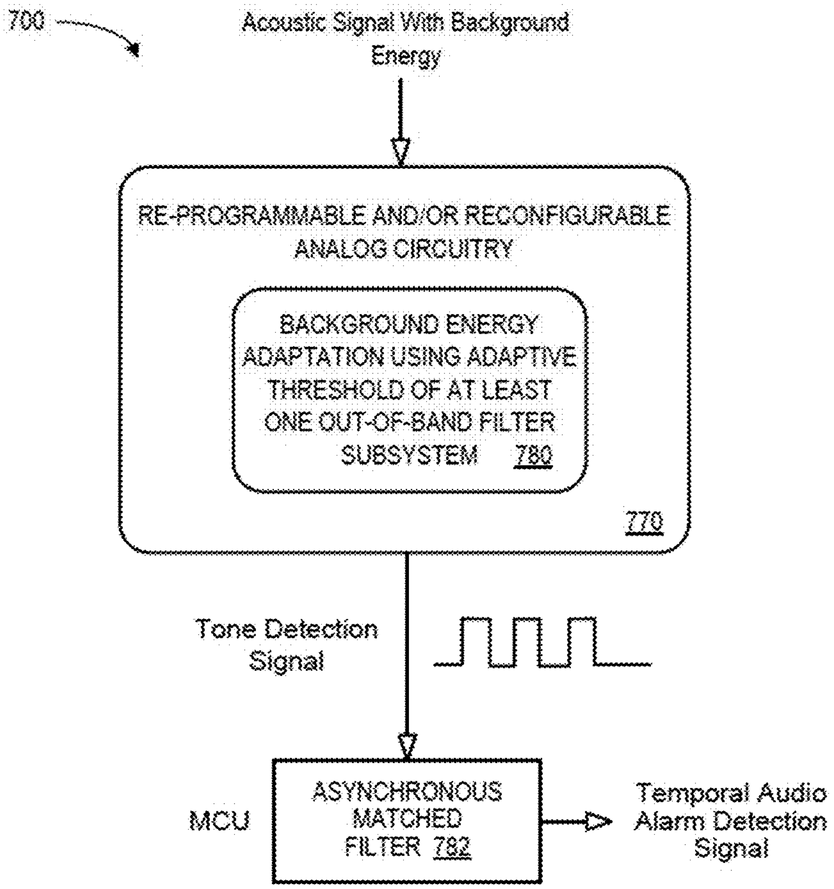
FIG. 7A is a system with background energy adaptation in accordance with some embodiments.

Another reason why accurate detection of a temporal audio alarm can be difficult when the audio tone detector 550 is a substantial distance from an alarm is background energy. For example, FIG. 7A is a system 700 with background energy adaptation (e.g., to account for the noise produced by a fan in the room) in accordance with some embodiments. In particular, re-programmable and/or reconfigurable analog circuitry 770 may utilize at least one threshold adapted from an out-of-band filter subsystem 780 to generate a tone detection signal. As a result, the background energy may be reduced or eliminated making the signal easier to analyze when generating the tone detection signal that provided to an asynchronous matched filter 782 (e.g., interrupt-based and incorporated in an MCU) that creates the final temporal audio alarm detection signal. Note that the out-of-band filter subsystem 780 that addresses background energy may comprise the same filter 680 that addresses reverberation noise as described with respect to FIG. 6A. The out-of-band filter subsystem 780 may use a series of filters to extract environmental acoustic energy (e.g., noise) within the area where the alarm is being monitored. Changes in the acoustic signature of the environment may correspond to changes in the background noise that is experienced by the system. This noise may have content across the frequency spectrum and, as a result, the adaptive threshold may be adjusted such that partial frequency content in the same range as the alarm's frequency will not cause a false alarm. In some embodiments, the out-of-band filter subsystem 780 uses multiple frequency bands to normalize the background noise into the adaptive threshold (e.g., so that the alarm tones can be detected at different and changing levels of background noise). Adjusting the adaptive threshold to changes in the background noise may help prevent the system from responding to such changes with a false alarm. The out-of-band filter subsystem 780 may also act as an adaptable baseline to help ensure that the system does not falsely detect the presence of an alarm from noise content.

Figure 7B:
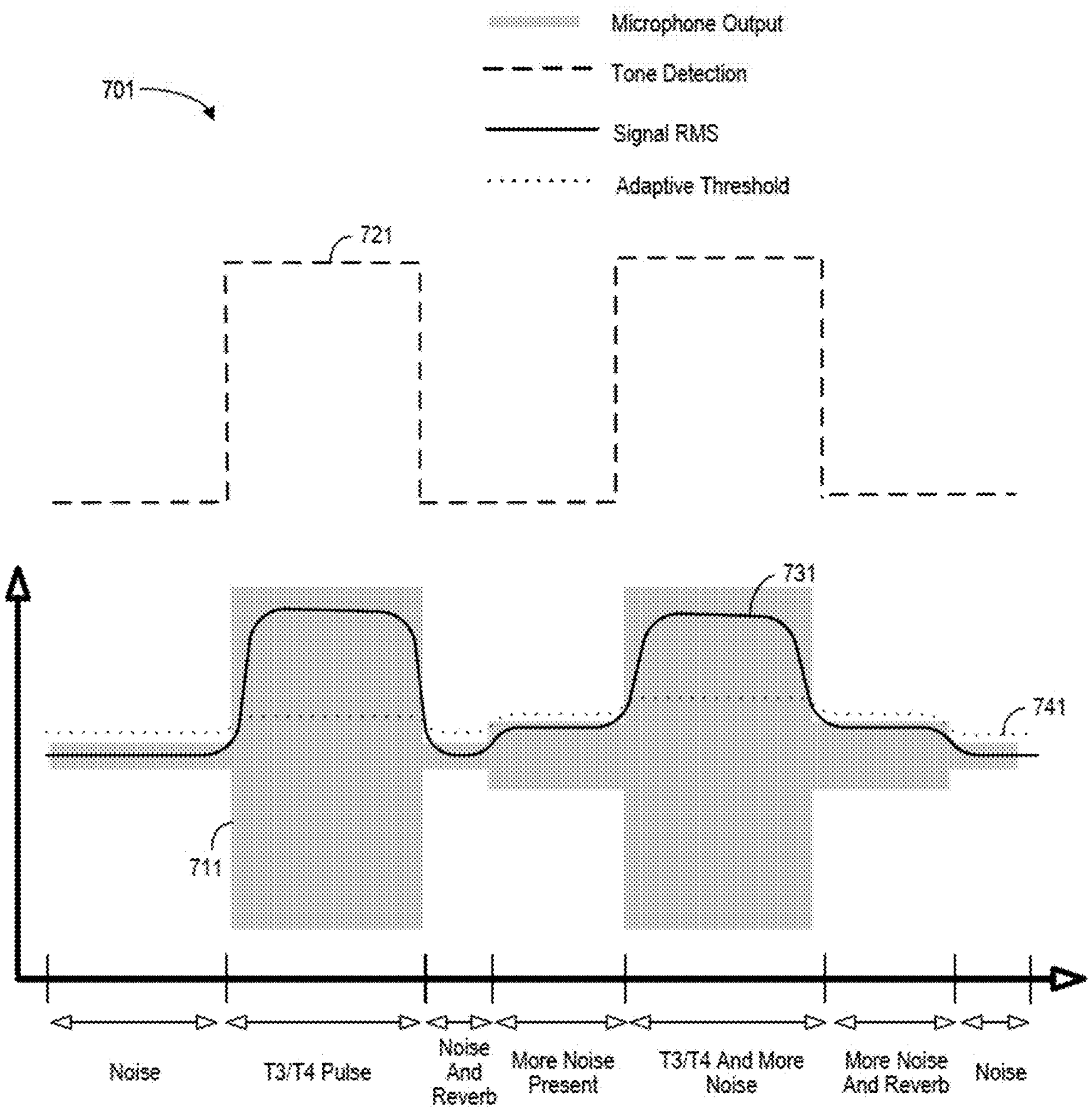
FIG. 7B illustrates signals according to some embodiments.

FIG. 7B is an example 701 illustrating signals with adaptive threshold behavior according to some embodiments. In particular, a microphone output 711 is turned into a tone detection signal 721 based on a signal Root Mean Square ("RMS") 731 and an adaptive threshold 741. In general, the tone detection signal 721 will only go high when the signal RMS 731 rises above the adaptive threshold 741. The example 701 starts with "noise" (referring to a typical background noise scenario. In this region, the adaptive threshold is tracking the background noise) and the signal RMS 731 is not high enough to generate a tone detection pulse. The next region is "T3/T4 pulse." In this region, the adaptive threshold 741 stays relatively the same (because it is ignoring the frequency range of the T3/T4 pulse). Note that the adaptive threshold 741 may increase slightly during a pulse because the acoustics of the alarm may bleed into other frequency ranges as it bounces off walls. The signal RMS 731 tracks the T3/T4 pulse, and the tone detection signal 721 generates a pulse. The next region is "noise and reverberation", the signal RMS 731 drops back down (now that the tone is no longer present) and the tone detection signal 721 goes low.

The next region in the example 701 is "more noise present" (the background noise may increase, for example, either through a disturber event such as a fan turning on it may be representative of a different environment—each room in a house may have a different background noise level). In this region, the adaptive threshold 741 increases which may be necessary because the signal RMS 731 may increase as well As more noise is added, more frequency content of the microphone output 711 may fall within the range of an alarm's frequency. As a result, the adaptive threshold 741 may be increased such that that the system does not generate a false positive tone detection signal 721. The next region is "T3/T4 pulse and more noise" which behaves similarly to the first T3/T4 pulse region (with the signal RMS 731 rising above the adaptive threshold 741) causing the tone detection signal 721 to go high. The last two regions show the transition back to "more noise" (without the T3/T4 pulse) and finally back to the baseline "noise" with the expected changes to the signal RMS 731 and adaptive threshold 741.

Figure 8:
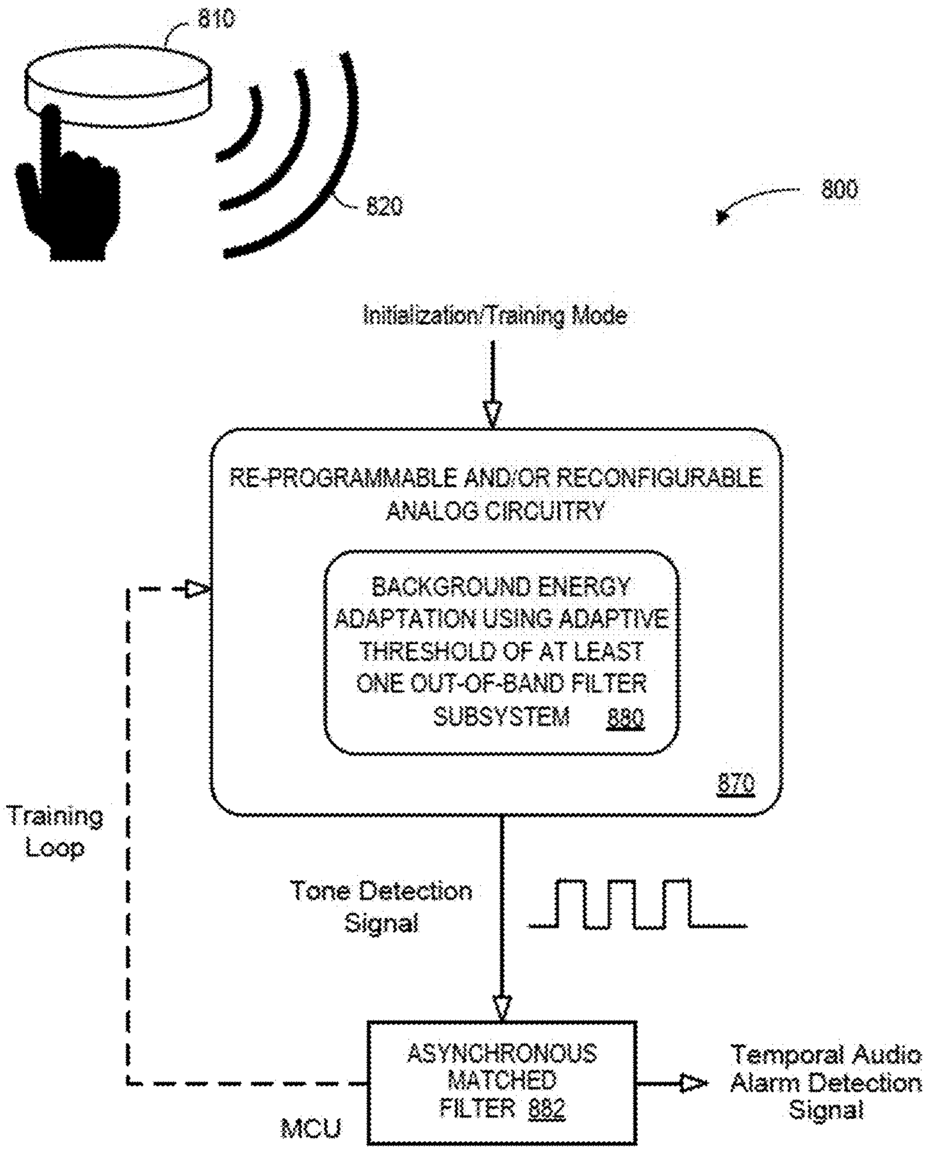
FIG. 8 is a system with a training mode according to some embodiments.

According to some embodiments, an initialization or training mode may be utilized. For example, FIG. 8 is a system 800 with a training mode according to some embodiments. When placed in the initialization or training mode, re-programmable and/or reconfigurable analog circuitry 770 may listen for an alarm tone and/or pattern 820 emitted by an alarm 810 (e.g., when an installer presses a test button on the alarm 810). The analog circuitry 870 can then use the detected sound to improve generation of a tone detection signal via at least one threshold adapted by an out-of-band filter subsystem 880. As before, the tone detection signal may be provided to an asynchronous matched filter 882 (e.g., interrupt-based and incorporated in an MCU) that creates the final temporal audio alarm detection signal.

Figure 9A:
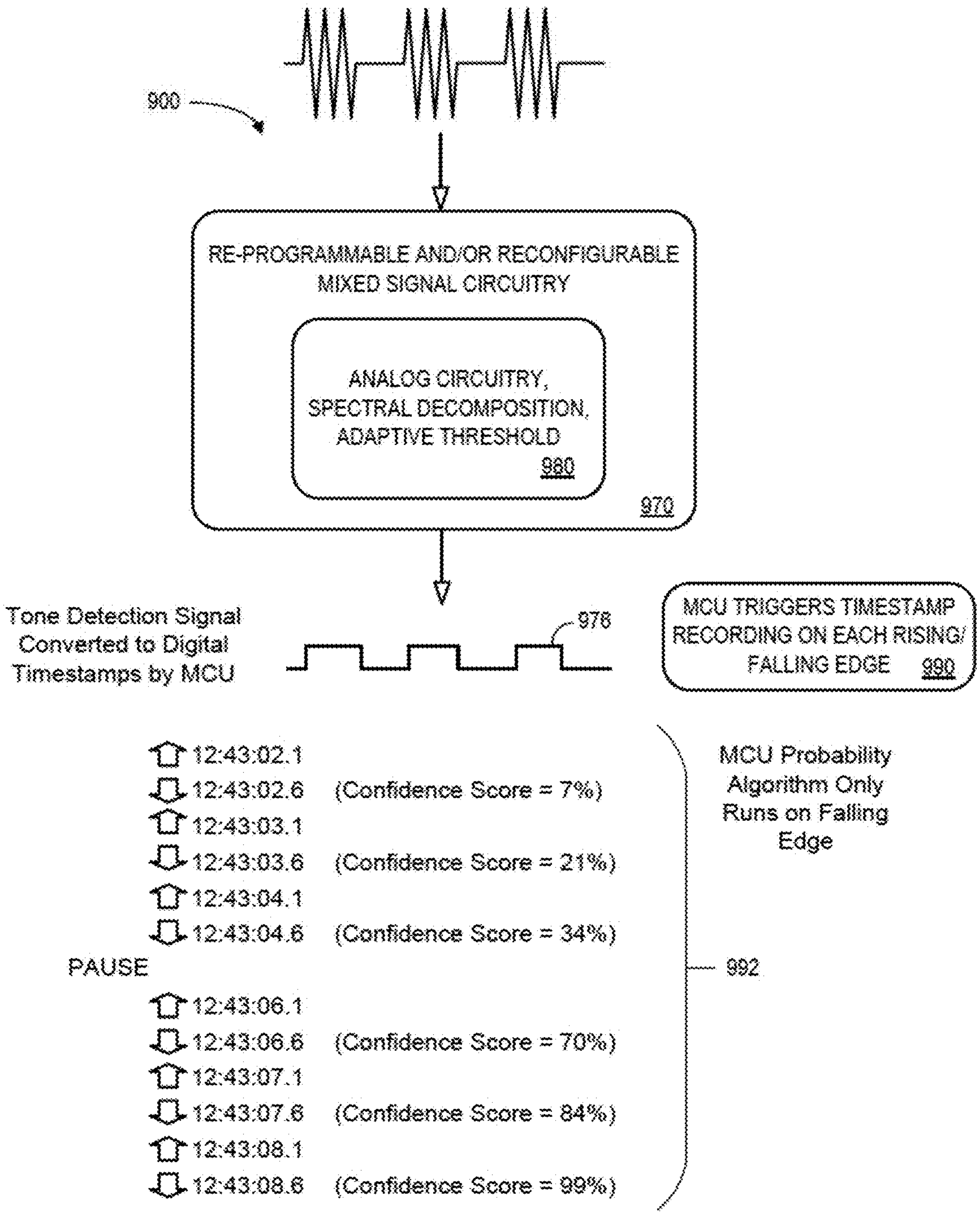
FIGS. 9A, 9B, and 9C illustrate a system with digital timestamps and confidence scores in accordance with some embodiments.
Figure 9B:
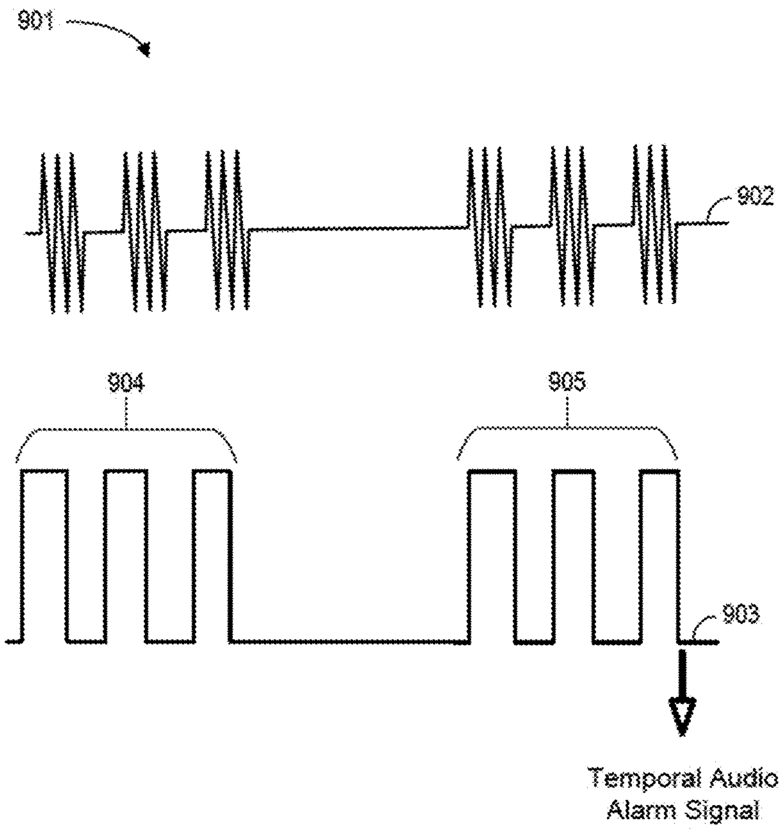

According to some embodiments, the tone detection signal acts as a wake-up signal to a digital processor (e.g., to improve power consumption and battery performance). For example, FIGS. 9A and 9B illustrate a system with digital timestamps and confidence scores for a T3 alarm in accordance with some embodiments. As shown by the system 900 of FIG. 9A, re-programmable and/or reconfigurable mixed circuitry 970 includes analog circuitry, spectral decomposition, and an adaptive threshold 980 to analyze a received acoustic signal and send a tone detection signal 976 to an MCU 990. The MCU 990 may, upon receipt of a rising or falling edge in such a signal, wake-up and create/record a digital timestamp for each edge of the tone detection signal 976 indicating when the change occurred. A series of these digital timestamps 992 may then be analyzed looking for various tone patterns. According to some embodiments, a confidence score is generated at each falling edge and may be associated with each timestamp that has been logged previously and/or a temporal audio alarm detection output may be created based on the series of timestamps 992. When the mixed circuitry 970 detects tones at multiple frequencies, the digital analysis of the timestamps 992 may be tone agnostic or the timestamps may be separated by different frequencies.

Figure 9C:
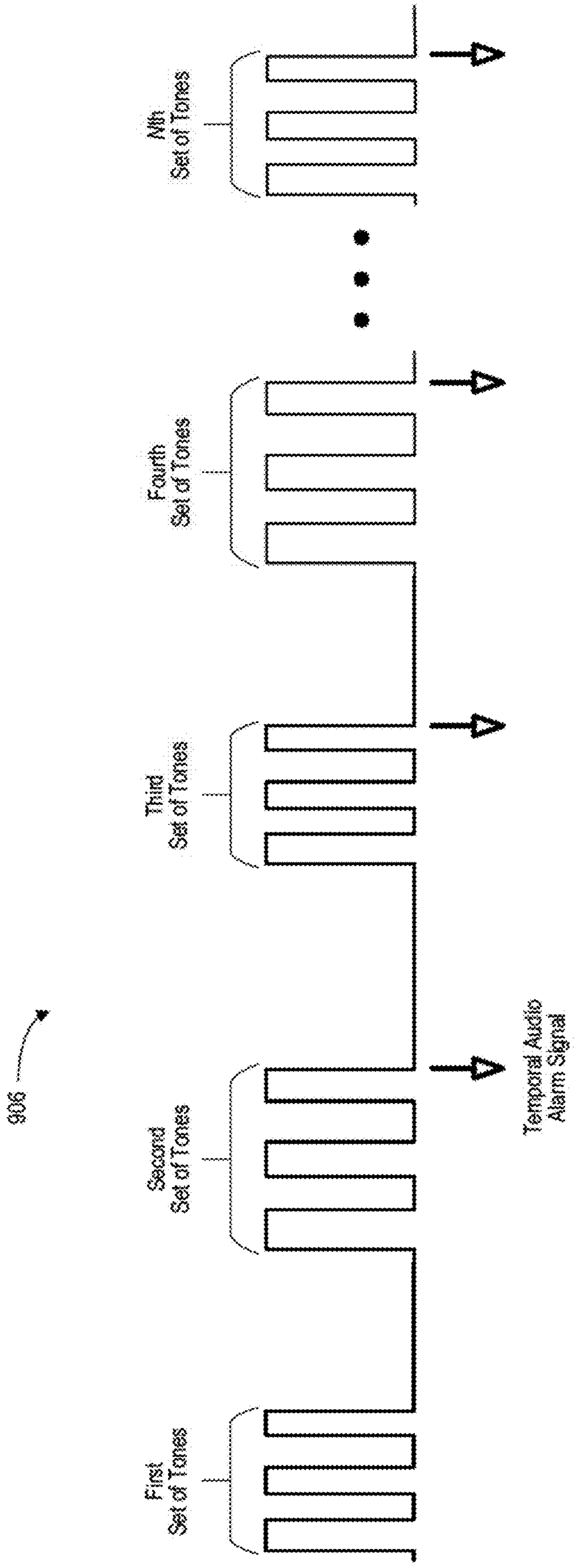

As illustrated by the series of timestamps 992 shown in FIG. 9A, each rising (up arrow) and falling edge (down arrow) is associated with a time of occurrence (e.g., the first rising edge was detected at time "12:43:02.1"). Note that a tone sequence might be slow or fast (e.g., as a battery drains and the tolerance for timing may not be high) and imprecise timing cause an alarm tone to be missed. To address this, a matched filter may be run against warped target sequences. Moreover, according to some embodiments a probability algorithm is executed by the MCU 990 after each falling edge to calculate a confidence score (representing how likely it is that a T3 alarm pattern has been detected). In some embodiments, the confidence score may correspond to a cross-correlation, valid only at the falling edges, between the tone detection signal and the candidate tone pattern. Other embodiments may use alternate confidence scores, for example, a correlation which applies more weight to the "on" portion of the pattern may more accurately detect candidate tone patterns such as T4 that are highly imbalanced with regard to the "on" versus the "off" duration. At the first falling edge at time "12:43:02.6" the confidence score is only 7%. As more rising and falling edges are detected (along with an appropriate pause after a set of three tones), the confidence score eventually rises to 99%. At this point, the system 900 may output a temporal audio alarm signal. FIG. 9B illustrates 901 when such an output signal may be output according to some embodiments. A detected acoustic signal 902 includes two sets of alarm tones (each having three sounds in the case of a T3 alarm) and is converted into a tone detection signal 903. The tone detection signal 903 includes first set of rising and falling edges representing a first set of alarm tones 904 followed by a second set of rising and falling edges representing a second set of alarm tones 905 (with the two sets 904, 905 being separated by a 1.5 second pause as defined in the T3 specification). According to some embodiments, a T3 temporal audio alarm signal is output after the second set of tones 905 is detected (without waiting for the 1.5 second pause that would be expected after the second set 905). After the second set of tones 905 and a T3 temporal audio alarm signal is output, the system will continue to monitor for acoustic content. If a third set of tones occur, the system will reference the timestamps from the second set of tones 905 and continue to report that a T3 audio alarm has been detected as illustrated by the example 906 of FIG. 9C. The system will continue to report the presence of a T3 audio alarm until it is no longer present, based on the timing between the most recent set of tones and the previous set. However, other embodiments may use any other pattern recognition algorithm.

Digital-based detection systems typically convert sensor data into digital data before analyzing the sensor data (e.g., by executing algorithm). This often results in all of the sensor data being converted, even though only a small portion of the sensor data is relevant to the particular use case. This is an inefficient design that consumes more power than necessary (and runs extra operations on the sensor data than necessary).

According to some embodiments, each analog processing system may be on at all times and draw power from an energy source such as a battery. In some embodiments, the battery may be a rechargeable battery. The low power analog design of an analog processing system may limit the amount of power that is consumed by the analog processing system.

Some embodiments are directed to an analog processing system that relies on an analog circuit instead of a digital circuit. The design of the analog processing system is flexible and programmable and consumes less power than traditional sensor-based systems. The analog processing system may include one or more sensors attached to the analog circuit, a microprocessor, a storage, an interface, signal processing modules, and the like, which are also attached to the analog circuit and in communication with the other components within the analog processing system. The sensors may be affixed to the analog circuit providing for efficient sensor integration and communication with algorithms stored by the analog processing system.

The analog processing system may be integrated within a system and may detect alarm signals that occur with respect to the system. The sensor data may be processed by the system to yield actionable results that can be used (e.g., software of a central controller or home security system) to take additional actions in response to an alarm.

The analog processing system may be ultra-low power yet provide high-performance solutions. This enables the analog processing system to be turned "on" continuously without using too much power.

Analog algorithms may be developed using PYTHON® or other programming languages. The algorithms may be deployed on the analog processing system, a structure, a server, and the like. Algorithms can be loaded into a memory of the analog circuit which can address different types of software applications and use cases. Furthermore, the offset and/or the mismatch of the sensors can be tuned when they are added to the analog circuit, thereby preventing such tuning from needing to be performed later on by a user. The analog processing system provides the low power of an analog circuit, with the versatility, repeatability and usability similar to a digital circuit.

Figure 10A:
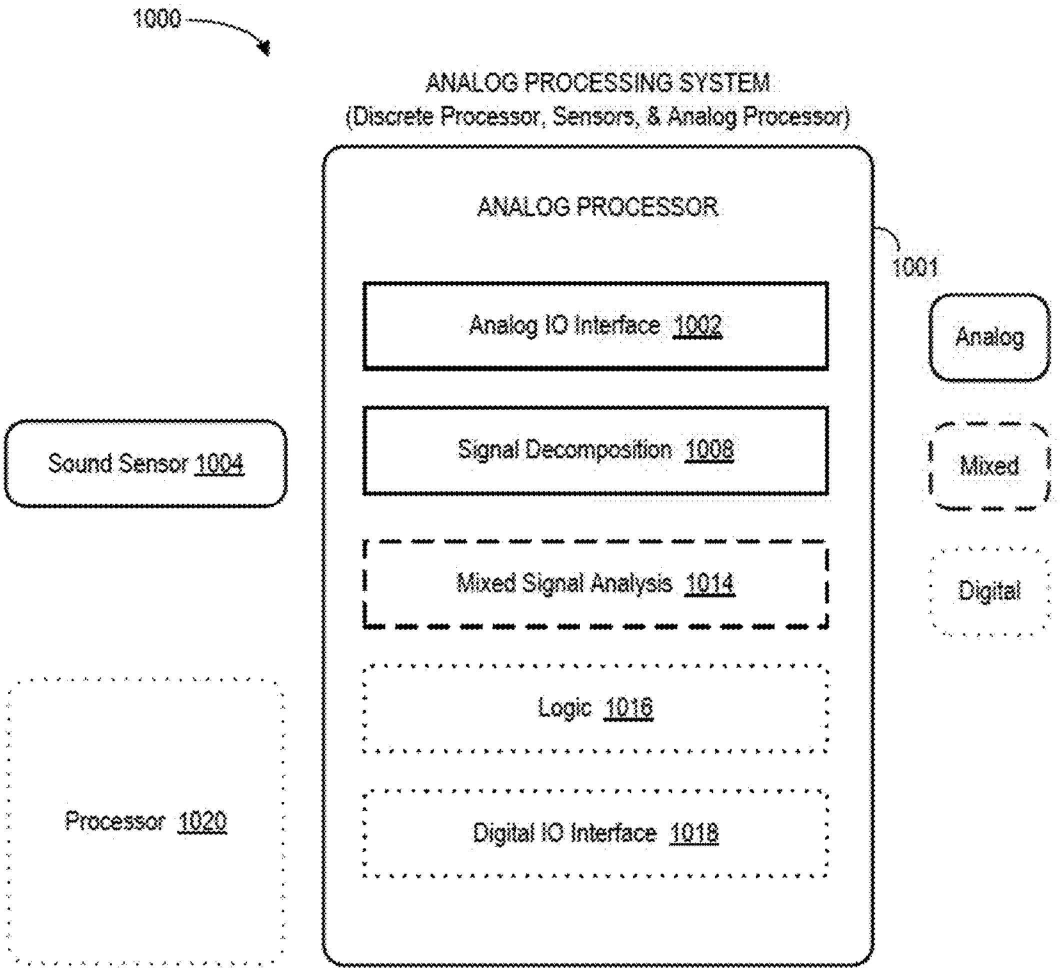
FIG. 10A is a diagram illustrating an analog processing system with a discrete processor, sensors, and analog processor in accordance with an example embodiment.

FIG. 10A is a diagram illustrating an analog processing system 1000 with a discrete processor, sensors, and analog processor in accordance with an example embodiment. The analog processing system 1000 may include an analog processor 1001 with an analog Input Output ("IO") interface 1002 that is capable of input and output of analog communications with other devices and systems. The analog processing system 1000 may include sensors such as an audio sensor 1004 (e.g., a microphone, etc.) that is capable of listening for and recording sensor data of sounds that occur (e.g., changes in sound, etc.). As another example, the analog processing system 1000 may include a supplemental sensor (e.g., a piezoelectric sensor) that is capable of listening for and measuring changes in one or more attributes such as pressure, temperature, moisture, and the like.

The analog processing system 1000 may include a signal decomposition module 1008, a mixed signal analysis module 1014, programmable logic 1016, and a digital IO interface 1018 that is capable of receiving digital communications from other systems and software. The analog processing system 1000 also includes a processor 1020 (e.g., a microprocessor or microcontroller) that is capable of managing and controlling the operation of the other components within the analog processing system 1000. The processor 1020 may also be attached to the analog circuit and may be coupled to the sensor 1004 and other components.

The analog processor 1001 can be configured via software to perform a specific function such as detecting events and waking up other components within the system. The configuration of the various components illustrated in FIG. 10A may be defined in software and stored in memory. Furthermore, specific operation and tuning of each analog component may also be stored in memory. For example, the processor 1020 may communicate data stored in memory to various blocks in FIG. 10A to replicate the functional "signal" chain developed in software. The amount of power consumed is very limited (e.g., ultra-low, etc.) due to the analog design.

In the example of FIG. 10A, each of the components are operating on the same processing device. As another example, one or more components may be disposed on a separate processing device and be communicably coupled to the other processing device. For example, an algorithm may be implemented in the separate processing device separate from the remaining components of the analog processing system 1000. In this example, the analog processing system 1000 may receive the sensor data, analyze it, and output it to the algorithm on the separate processing device. The algorithm on the separate processing device may perform similar or different functions as the algorithm within the analog processing system 1000.

Figure 10B:
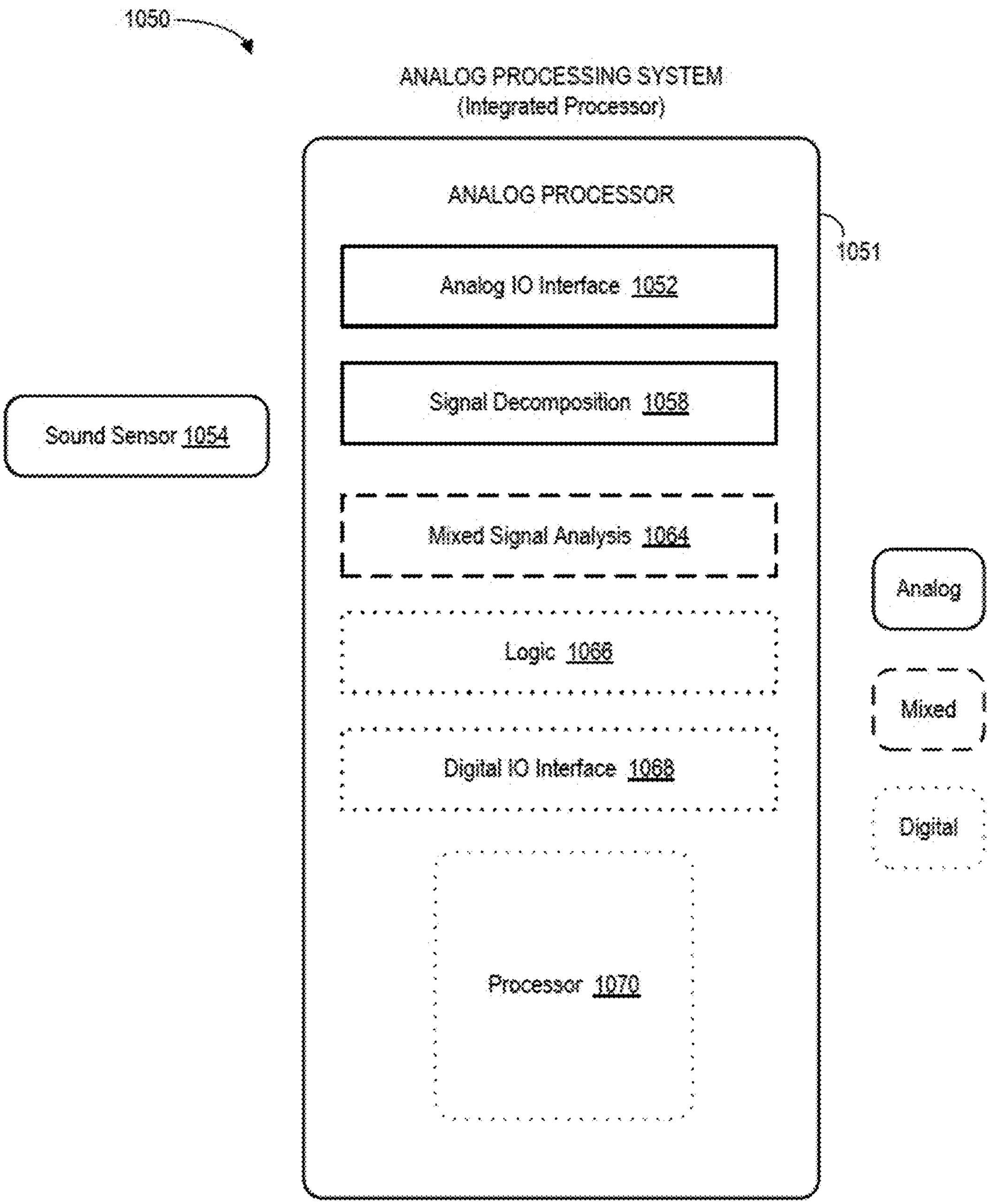
FIG. 10B is a diagram illustrating an analog processing system with an integrated processor according to another embodiment.

FIG. 10B is a diagram illustrating an analog processing system 1050 with an integrated processor according to another embodiment. The analog processing system 1050 may include an analog processor 1051 with an IO interface 1052 that is capable of input and output of analog communications with other devices and systems. The analog processing system 1050 may include sensors such as a sound sensor 1054 that is capable of listening for and recording sensor data of sounds that occur. As another example, the analog processing system 1050 may include a supplemental sensor that is capable of listening for and measuring changes in one or more attributes such as pressure, temperature, moisture, and the like.

The analog processing system 1050 may include a signal decomposition module 1058, a mixed signal analysis module 1064, programmable logic 1066, and a digital IO interface 1068 that is capable of receiving digital communications from other systems and software. The analog processing system 1050 also includes a processor 1070 that is capable of managing and controlling the operation of the other components within the analog processing system 1050.

Figure 11:
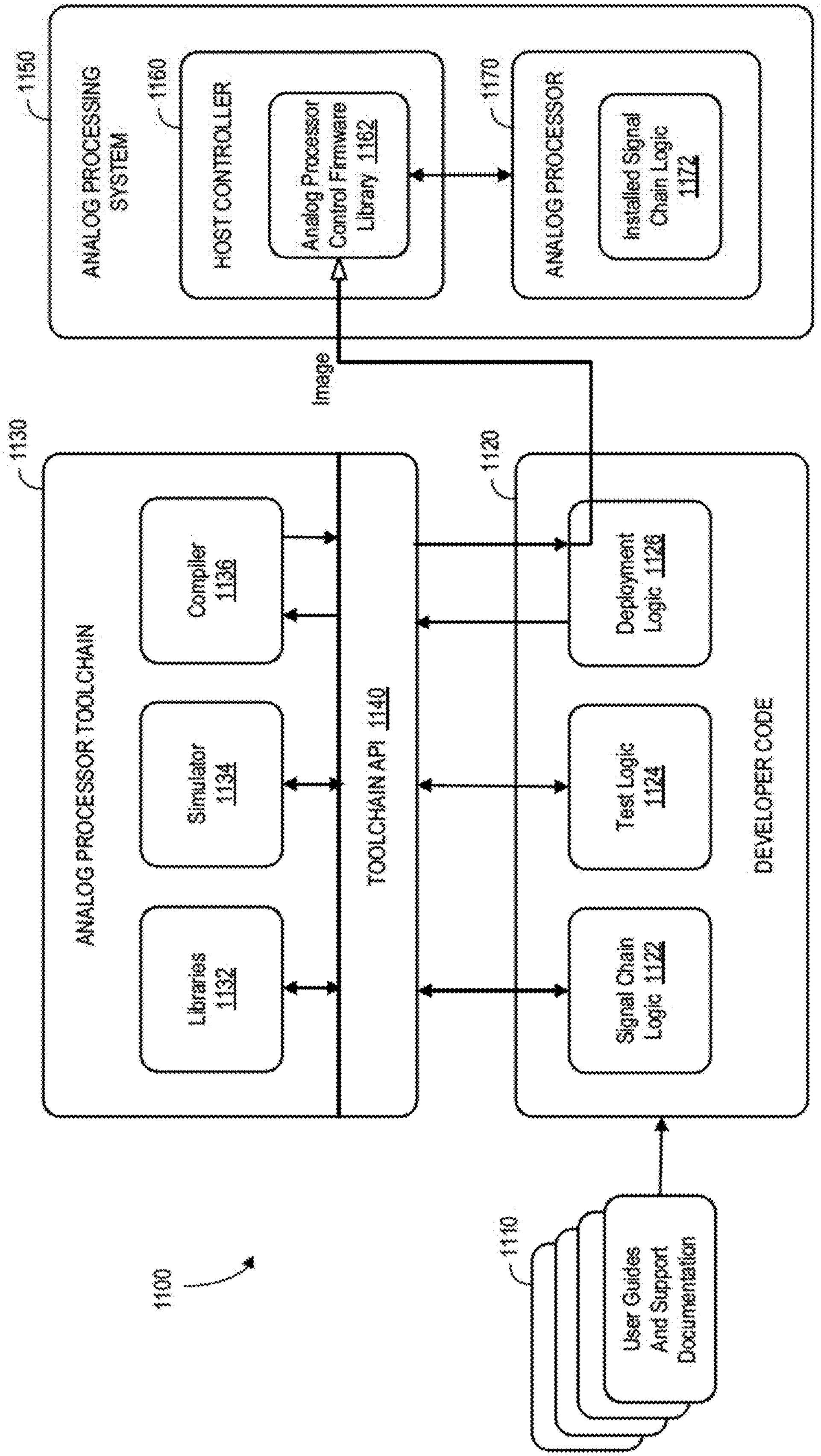
FIG. 11 is a diagram illustrating a process of installing logic onto an analog processing system in accordance with an example embodiment.

FIG. 11 is a diagram illustrating a process 1100 of installing logic onto an analog processing system 1150 in accordance with an example embodiment. Referring to FIG. 11, a developer may program an analog processing system 1150 to perform operations. For example, the developer may program logic into the analog processing system 1150 to identify different noises and sounds, including those associated with alarms, and the like.

In particular, user guides and support documentation 1110 may inform the creation of developer code 1120. For example, the developer may compose signal chain logic 1122 from elements (e.g., building blocks) found in libraries 1132 of an analog processor toolchain 1130. The composition actions may be performed via a toolchain API 1140 associated with the analog processor toolchain 1130. The developer may also write test logic 1124 to validate the signal chain logic 1122 via a simulator 1134 that may also be invoked by the toolchain API 1140. In addition, the developer may write deployment logic 1126 to generate a "runnable" image for an analog processor 1170 target. The compilation action may be performed by a compiler 1136 invoked via the toolchain API 1140. The compiler 1136 may compile code in a programming language, such as PYTHON®. Within the analog processing system 1150, an analog processor control firmware library 1162 running on a host controller 1160 configures the analog processor 1170 according to the image to create installed signal chain logic 1172. The installed signal chain logic 1172 may implement an algorithm, such as the one described in connection with FIGS. 9A and 9B.

Figure 12A:
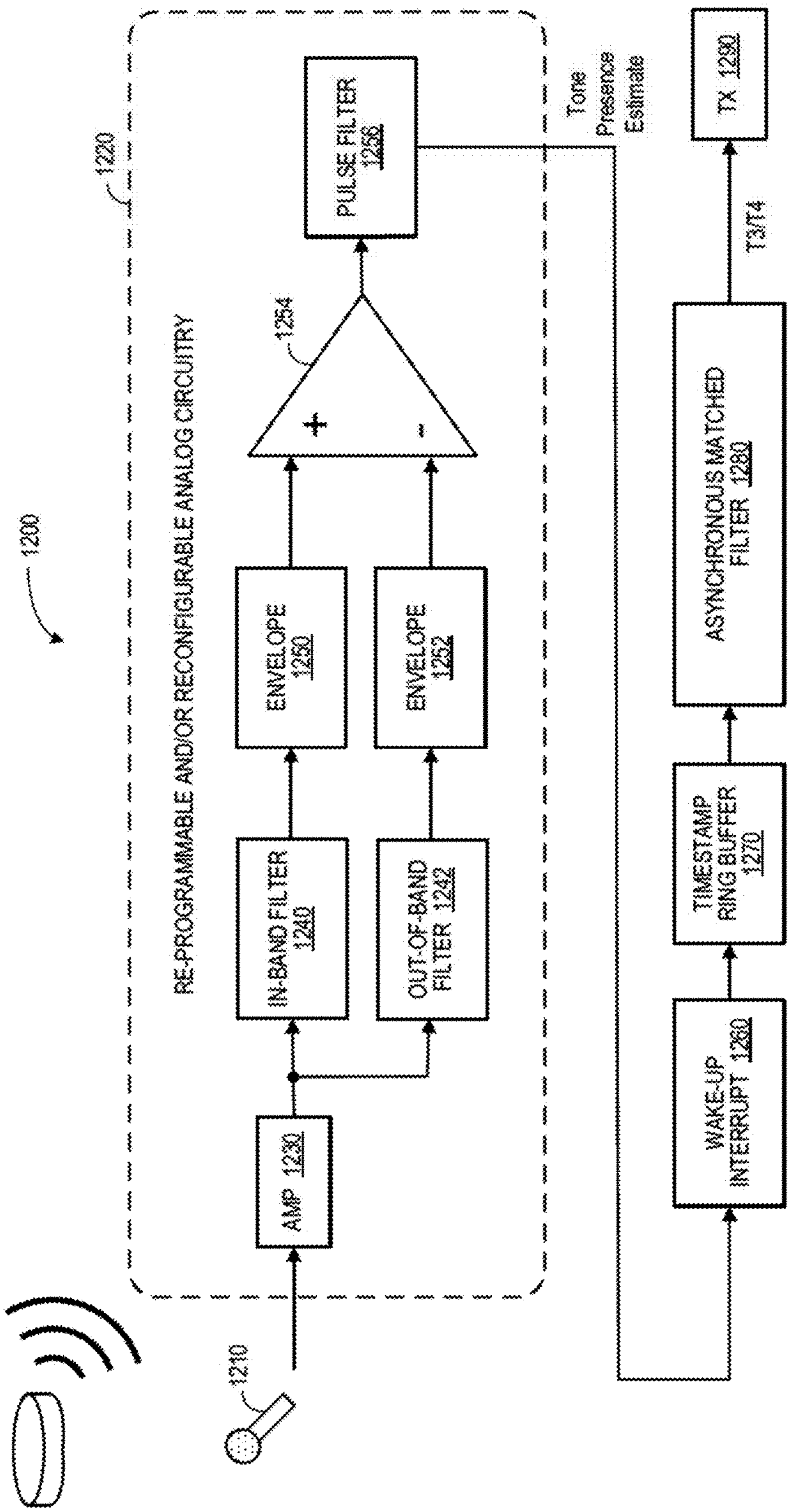
FIG. 12A is a more detailed system for audio tone detection according to some embodiments.

FIG. 12A is a more detailed system 1200 for audio tone detection according to some embodiments. The system 1200 includes re-programmable and/or reconfigurable analog circuitry 1220 that analyzes an acoustic signal received from a microphone 1210. The analog circuitry 1220 includes an amplifier 1230 that provides information to an envelope component 1250 via an in-band filter 1240, and the output of the envelope component 1250 is provided to a comparator 1254. The output of the amplifier 1230 is also provided to another envelope component 1252 via an out-of-band filter 1242. The output of this other envelope component 1252 represents an adapted threshold that is also provided to the comparator 1254. The output of the comparator 1254 is provided to a pulse filter 1256 to create a tone presence estimate (e.g., a tone detection signal).

The tone presence estimate from the re-programmable and/or reconfigurable analog circuitry 1220 may be received by a digital processor (e.g., a MCU) as a wake-up interrupt 1260. This causes the digital processor to add a digital timestamp to a timestamp ring buffer 1270 (e.g., in accordance with a timer) in response to each rising and falling edge. If the tone presence estimate indicated that an alarm has transitioned from "present" to "not present", an asynchronous sampling matched filter 1280 is utilized. As a result, an indication of a T3 or T4 may be transmitted 1290. In some embodiments, an identifier of a determined alarm event may be transmitted to a computing system via an interface (e.g., the event identifier may be provided to a central controller or home security system). The timestamps stored in the ring buffer 1270 of the MCU (also referred to as a "circular buffer") may comprise a data structure that operates as if it were connected end-to-end). According to some embodiments, the ring buffer 1270 is a list of memory addresses that can be written and read sequentially. When the ring buffer 1270 is full, it wraps back around to the first memory location for the next timestamp. This allows the MCU to keep track of all timestamps that have recently occurred. The algorithm can then leverage the interrupt-based, asynchronous matched filter 1280 on the ring-buffer 1270 to go through all of the previous timestamps and generate a confidence score. If the system 1200 is tracking tones at multiple frequencies, it can utilize multiple, separate ring buffers 1270 to track the timestamps for each frequency.

Figure 12B:
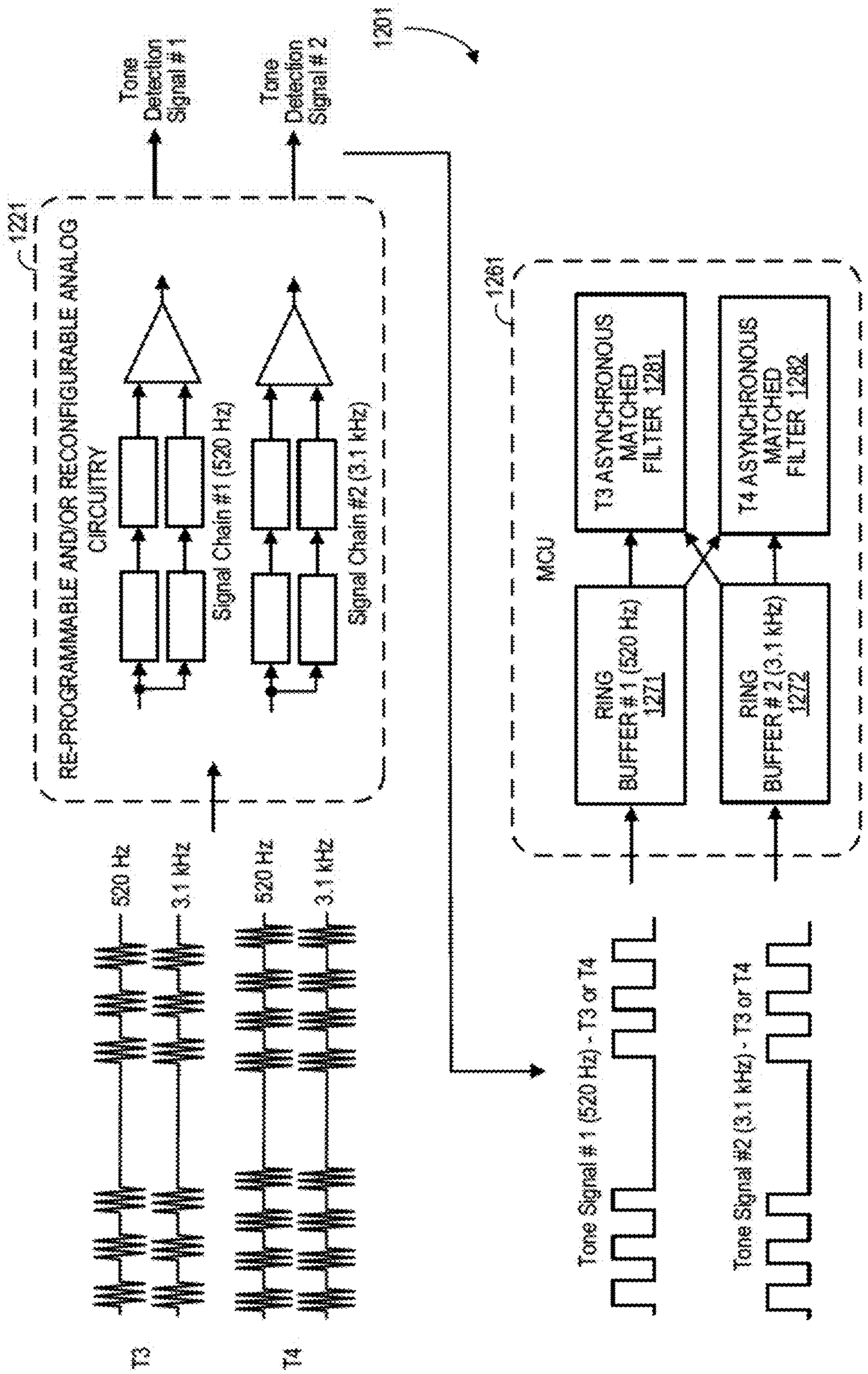
FIG. 12B is a system for detecting multiple patterns and/or frequencies in accordance with some embodiments.

For example, FIG. 12B is a system 1201 for detecting multiple patterns and/or frequencies in accordance with some embodiments. In this embodiments, re-programmable and/or reconfigurable analog circuitry 1221 may look for four potential alarms: two T3 alarms (one at 520 Hz and one at 3.1 kHz) and two T4 alarms (one at 520 Hz and one at 3.1 kHz). The analog circuitry 1221 includes a first signal chain (associated with 520 Hz) that outputs a first tone detection signal and a second signal chain (associated with 3.1 kHz) that outputs a second tone detection signal. Each different signal chain (corresponding to a specific frequency) may be programmed to match the desired frequency (and background/reverberation reduction may also be programmed to match). The first and second tone detection signals are then provided to an MCU 1261. In particular, the first tone detection signal is provided to a first ring buffer 1271 and the second tone detection signal is provided to a second ring buffer 1272 (e.g., as interrupts when either a rising or falling edge occurs). A T3 version of an asynchronous matched filter 1281 and a T4 version of an asynchronous matched filter 1282 can then be used to analyze timestamps in the ring buffers 1271, 1272 (e.g., whenever a falling edge occurs).

Figure 13:
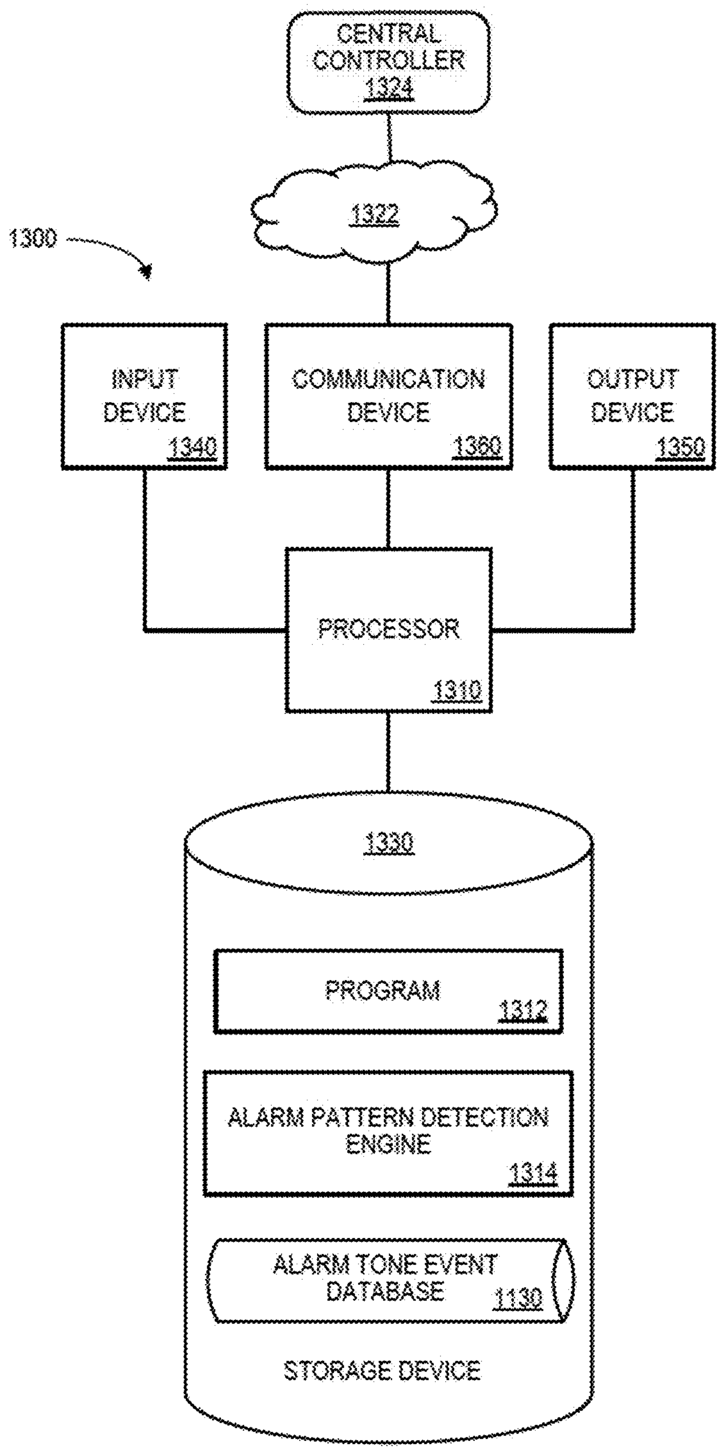
FIG. 13 is an apparatus or platform according to some embodiments.

Note that the embodiments described herein may be implemented using any number of different hardware configurations. For example, FIG. 13 is a block diagram of an apparatus or platform 1300 that may be, for example, associated with the system 100 of FIG. 1 (and/or any other system described herein). The platform 1300 comprises a processor 1310 (e.g., including a re-programmable and/or reconfigurable analog processor), such as one or more commercially available Central Processing Units ("CPUs") in the form of one-chip microprocessors, coupled to a communication device 1360 configured to communicate via a communication network 1322. The communication device 1360 may be used to communicate, for example, with one or more central controllers, etc. The platform 1300 further includes an input device 1340 (e.g., a computer mouse and/or keyboard to input alarm information, thresholds, etc.) and/an output device 1350 (e.g., a computer monitor to render a display, transmit recommendations and alerts, and/or create reports about alarm status, etc.). In some embodiments, signals may be automatically transmitted via the communication network 1322 in response to a detected alarm event (e.g., to sound a central controller 1324).

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1312 and/or alarm pattern detection engine 1314 for controlling the processor 1310. The processor 1310 performs instructions of the programs 1312, 1314, and thereby operates in accordance with any of the embodiments described herein. For example, the processor 1310 may receive the tone detection signal, generate a digital timestamp, and analyze a series of digital timestamps to detect at least one temporal audio alarm pattern (e.g., a T3 or T4 audio alarm pattern).

The programs 1312, 1314 may be stored in a compressed, uncompiled and/or encrypted format. The programs 1312, 1314 may furthermore include other program elements, such as an operating system, clipboard application, a database management system, and/or device drivers used by the processor 1310 to interface with peripheral devices.

As used herein, information may be "received" by or "transmitted" to, for example: (i) the platform 1300 from another device; or (ii) a software application or module within the platform 1300 from another software application, module, or any other source.

In some embodiments (such as the one shown in FIG. 13), the storage device 1330 further stores an alarm tone event database 1400. An example of a database that may be used in connection with the platform 1300 will now be described in detail with respect to FIG. 14. Note that the database described herein is only one example, and additional and/or different information may be stored therein. Moreover, various databases might be split or combined in accordance with any of the embodiments described herein.

Referring to FIG. 14, a table is shown that represents the alarm tone event database 1400 that may be stored at the platform 1300 according to some embodiments. The table may include, for example, entries identifying events that occurred in connection with an alarm being monitored. The table may also define fields 1402, 1404, 1406, 1408 for each of the entries. The fields 1402, 1404, 1406, 1408 may, according to some embodiments, specify: an alarm tone identifier 1402, a date and time 1404, a detected alarm tone event identifier 1406, and a triggered action 1408. The alarm tone event database 1400 may be created and updated, for example, when an alarm tone or pattern is detected, an acoustic signal passes a threshold, etc.

The alarm tone identifier 1402 might be a unique alphanumeric label that is associated with a particular audio alarm that has been detected. The date and time 1404 may indicate when a particular event was detected. The detected alarm tone event identifier 1406 might describe, for example, details about the event (e.g., whether the event is associated with a T3 and/or T4 alarm, etc.). The triggered action 1408 might describe what was done in response to the detected event (e.g., an electronic message might have been automatically transmitted to a communication address associated with a central controller or local fire department).

In this way, embodiments may provide audio tone detection in an accurate, automatic, and power efficient manner. Moreover, detection may be performed at a device located a substantial distance from an alarm (e.g., seven meters away).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of audio alarms, any of the embodiments described herein could be applied to other types of audio alarms.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed is:

1. A system, comprising:

a sound sensor; and re-programmable and/or reconfigurable analog circuitry configured to monitor an acoustic signal sensed by the sound sensor and selectively generate a tone detection signal in response to an analysis of the acoustic signal and presence of at least one pre-determined tone frequency, and a digital Microcontroller Unit ("MCU"), coupled to the analog circuitry, that receives the tone detection signal as a digital tone detection signal interrupt that causes the MCU to awake from a low power state and create a digital timestamp at each rising and falling edge of the tone detection signal.

2. The system of claim 1, wherein the MCU further analyzes a series of digital timestamps, corresponding to rising and falling edges of the tone detection signal, to detect at least one temporal audio alarm pattern and output a temporal audio alarm detection signal.

3. The system of claim 2, wherein the temporal alarm pattern is a temporal-three ("T3") or a temporal-four ("T4") audio alarm pattern.

4. The system of claim 3, wherein the sound sensor comprises a Micro-Electro-Mechanical System ("MEMS") microphone.

5. The system of claim 2, wherein the analysis of the acoustic signal includes reverberation reduction performed using a threshold adapted by an out-of-band filter subsystem of the analog circuitry.

6. The system of claim 3, wherein the analysis of the acoustic signal includes background energy adaptation using at least one out-of-band filter subsystem of the analog circuitry.

7. The system of claim 6, wherein the background energy adaptation is trained during installation.

8. The system of claim 7, wherein the tone detection signal is used by the MCU to generalize a tone presence estimate and confidence score.

9. The system of claim 8, wherein a matched filter is run against warped target timestamp sequences.

10. The system of claim 1, wherein the re-programmable and/or reconfigurable analog circuitry analyzes the acoustic signal for a plurality of different tone detection conditions.

11. The system of claim 10, wherein the analysis generalizes in-band and out-of-band information associated with spectral normalization.

12. The system of claim 10, wherein the different tone detection conditions are associated with different frequency ranges.

13. A method, comprising:

receiving, by re-programmable and/or reconfigurable analog circuitry, an acoustic signal sensed by a sound sensor;

selectively generating, by the analog circuitry, a tone detection signal in response to an analysis of the acoustic signal and presence of at least one pre-determined tone frequency, receiving, by a digital 0Microcontroller Unit ("MCU"), the tone detection signal as a digital tone detection interrupt that causes the MCU to awake from a low power state; and creating, by the MCU, a digital timestamp.

14. The method of claim 13, further comprising:

analyzing, by the MCU, a series of digital timestamps triggered from the rising and falling edges of the tone detection signal received from the analog circuitry; and detecting, by the MCU, at least one temporal audio alarm pattern.

15. The method of claim 14, wherein the temporal alarm pattern is a temporal-three ("T3") or a temporal-four ("T4") audio alarm pattern.

16. The method of claim 13, wherein the analysis of the acoustic signal includes reverberation reduction performed using a threshold adapted by an out-of-band filter subsystem of the analog circuitry.

17. The method of claim 13, wherein the analysis of the acoustic signal includes background energy adaptation using at least one threshold adapted by an output of band filter subsystem of the analog circuitry.

18. A system, comprising:

a sound sensor;

analog circuitry configured to monitor an acoustic signal sensed by the sound sensor and selectively generate a tone detection signal in response to an analysis of the acoustic signal and presence of at least one pre-determined tone frequency, and a digital Microcontroller Unit ("MCU"), coupled to the analog circuitry, that receives the tone detection signal as a digital tone detection signal interrupt that causes the MCU to awake from a low power state and create a digital timestamp at each rising and falling edge of the tone detection signal.

* * * * *